(12) United States Patent
Tremblay et al.

(10) Patent No.: US 7,117,342 B2
(45) Date of Patent: Oct. 3, 2006

(54) IMPLICITLY DERIVED REGISTER SPECIFIERS IN A PROCESSOR

(75) Inventors: Marc Tremblay, Menlo Park, CA (US); William Joy, Aspen, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 868 days.

(21) Appl. No.: 09/204,479

(22) Filed: Dec. 3, 1998

(65) Prior Publication Data

US 2001/0052063 A1 Dec. 13, 2001

(51) Int. Cl.
 *G06F 9/30* (2006.01)
(52) U.S. Cl. ...................................................... 712/208
(58) Field of Classification Search ................ 711/209; 712/200, 208
 See application file for complete search history.

(56) References Cited

U.S. PATENT DOCUMENTS

| | | | | |
|---|---|---|---|---|
| 3,833,904 A * | 9/1974 | Gebhardt et al. | ............. | 342/83 |
| 3,931,615 A * | 1/1976 | Oliver et al. | ................ | 712/205 |
| 4,155,119 A * | 5/1979 | Ward et al. | ................... | 711/206 |
| 4,228,497 A | 10/1980 | Gupta | ......................... | 364/200 |
| 4,280,177 A | 7/1981 | Schorr et al. | ................ | 364/200 |
| 4,300,195 A * | 11/1981 | Raghunathan et al. | ......... | 712/33 |
| 4,502,111 A | 2/1985 | Riffe | ........................... | 364/200 |
| 4,969,091 A | 11/1990 | Muller | ........................ | 364/200 |
| 4,980,819 A | 12/1990 | Cushing et al. | ............. | 364/200 |
| 5,111,431 A | 5/1992 | Garde | ................... | 365/129.02 |
| 5,150,469 A * | 9/1992 | Jouppi | ......................... | 712/244 |
| 5,155,824 A | 10/1992 | Edenfield | .................... | 395/425 |
| 5,179,681 A | 1/1993 | Jensen | ........................ | 395/425 |
| 5,179,702 A | 1/1993 | Spix | ............................ | 395/650 |
| 5,185,872 A | 2/1993 | Arnold | ........................ | 395/375 |
| 5,187,791 A | 2/1993 | Baum | ........................ | 395/725 |
| 5,197,130 A | 3/1993 | Chen | ........................... | 395/325 |
| 5,222,240 A | 6/1993 | Patel | ........................... | 395/775 |
| 5,268,995 A | 12/1993 | Diefendorff | ................. | 395/122 |
| 5,301,340 A | 4/1994 | Cook | ........................... | 395/800 |
| 5,367,651 A | 11/1994 | Smith | ........................ | 395/700 |
| 5,388,235 A | 2/1995 | Ikenaga | ...................... | 395/375 |
| 5,440,714 A | 8/1995 | Wang | .......................... | 395/492 |
| 5,448,746 A | 9/1995 | Eickemeyer | ................. | 395/800 |
| 5,463,748 A | 10/1995 | Schwendinger | ............. | 395/375 |
| 5,467,476 A | 11/1995 | Kawasaki | .................... | 395/800 |

(Continued)

FOREIGN PATENT DOCUMENTS

EP 0213843 3/1987

(Continued)

OTHER PUBLICATIONS

Andrew S. Tanenbaum, "Structured Computer Organization", 1976, Ptentice-Hall, pp. 70-85.*

(Continued)

*Primary Examiner*—David Y. Eng
(74) *Attorney, Agent, or Firm*—Zagorin O'Brien Graham LLP

(57) ABSTRACT

A processor executes an instruction set including instructions in which a register specifier is implicitly derived, based on another register specifier. One technique for implicitly deriving a register specifier is to add or subtract one from a specifically-defined register specifier. Implicit derivation of a register specifier is selectively implemented for some opcodes. A decoder decodes instructions that use implicitly-derived register specifiers and reads the explicitly-defined register. The decoder generates pointers both to the explicitly-defined register and to the implicitly-derived register. In other embodiments, a pointer to registers within a register file includes an additional bit indicating that a register read is accompanied by a read of an implicitly-derived register.

21 Claims, 7 Drawing Sheets

U.S. PATENT DOCUMENTS

| | | | |
|---|---|---|---|
| 5,524,263 A | 6/1996 | Griffith | 395/800 |
| 5,530,817 A | 6/1996 | Masubuchi | 395/375 |
| 5,537,561 A | 7/1996 | Nakajima | 395/375 |
| 5,542,059 A | 7/1996 | Blomgren | 395/375 |
| 5,574,939 A | 11/1996 | Keckler | 395/800 |
| 5,577,200 A | 11/1996 | Abramson | 712/200 |
| 5,581,718 A | 12/1996 | Grochowski | 395/382 |
| 5,592,679 A | 1/1997 | Yung | 395/476 |
| 5,596,735 A | 1/1997 | Hervin | 395/586 |
| 5,598,544 A | 1/1997 | Ohshima | 398/380 |
| 5,642,325 A | 6/1997 | Ang | 365/230.05 |
| 5,657,291 A | 8/1997 | Podlesny et al. | 365/230.05 |
| 5,664,154 A | 9/1997 | Purcell | 711/167 |
| 5,689,674 A | 11/1997 | Griffith | 395/393 |
| 5,699,551 A | 12/1997 | Taylor | 711/207 |
| 5,713,039 A | 1/1998 | Tran | 395/800 |
| 5,721,868 A | 2/1998 | Yung et al. | 711/149 |
| 5,724,422 A | 3/1998 | Shang | 713/190 |
| 5,742,557 A | 4/1998 | Gibbins | 365/230.05 |
| 5,742,782 A | 4/1998 | Ito et | 395/386 |
| 5,761,470 A | 6/1998 | Yoshida | 395/386 |
| 5,761,475 A | 6/1998 | Yung et al. | 712/218 |
| 5,764,943 A | 6/1998 | Wechsler | 712/218 |
| 5,778,243 A | 7/1998 | Aipperspach | 395/800.11 |
| 5,778,248 A | 7/1998 | Leung | 712/23 |
| 5,784,630 A | 7/1998 | Saito | 395/800 |
| 5,787,303 A | 7/1998 | Ishikawa | 395/800.24 |
| 5,790,826 A * | 8/1998 | Thusoo et al. | 712/216 |
| 5,822,341 A | 10/1998 | Winterrowd | 371/43.7 |
| 5,826,096 A * | 10/1998 | Baxter | 712/24 |
| 5,835,793 A | 11/1998 | Li et al. | 395/898 |
| 5,860,113 A | 1/1999 | Tung | 711/144 |
| 5,872,963 A | 2/1999 | Bitar | 395/580 |
| 5,881,260 A | 3/1999 | Raje | 712/210 |
| 5,890,000 A | 3/1999 | Aizikowitz | 395/709 |
| 5,901,301 A | 5/1999 | Matsuo | 395/388 |
| 5,925,123 A | 7/1999 | Tremblay | 712/212 |
| 5,946,262 A | 8/1999 | Randolph | 365/230.05 |
| 5,951,674 A | 9/1999 | Morocho | 712/210 |
| 5,959,931 A | 9/1999 | Ueda | 365/230.05 |
| 5,974,538 A | 10/1999 | Wilmot, II | 712/218 |
| 5,982,699 A | 11/1999 | Dilbeck | 365/230.05 |
| 5,983,340 A | 11/1999 | Garey et al. | 712/200 |
| 6,009,510 A | 12/1999 | Henry | 712/204 |
| 6,023,757 A | 2/2000 | Nishimoto | 712/209 |
| 6,055,606 A | 4/2000 | Sharma | 711/131 |
| 6,055,620 A | 4/2000 | Paver | 712/201 |
| 6,076,159 A * | 6/2000 | Fleck et al. | 712/241 |
| 6,078,544 A | 6/2000 | Park | 365/230.05 |
| 6,085,289 A | 7/2000 | Tactchen | 711/118 |
| 6,092,175 A | 7/2000 | Levy | 712/23 |
| 6,122,218 A | 9/2000 | Kang | 365/230.05 |
| 6,144,609 A | 11/2000 | Lattimore | 365/230.05 |
| 6,212,544 B1 | 4/2001 | Borkenhagen | 709/103 |
| 6,249,167 B1 * | 6/2001 | Oguchi et al. | 327/291 |
| 6,311,261 B1 * | 10/2001 | Chamdani et al. | 712/23 |

FOREIGN PATENT DOCUMENTS

| | | |
|---|---|---|
| EP | 0272150 | 6/1988 |
| EP | 0380854 A2 | 9/1989 |
| EP | 0 483 967 | 5/1992 |
| EP | 0520425 A2 | 12/1992 |
| EP | 0520788 A2 | 12/1992 |
| EP | 0588341 A2 | 3/1994 |
| EP | 649085 A1 | 4/1995 |
| EP | 0653706 A2 | 5/1995 |
| EP | 0676691 A2 | 10/1995 |
| EP | 0 679 992 | 11/1995 |
| EP | 0718758 A2 | 11/1995 |
| EP | 0718758 | 6/1996 |
| EP | 0730223 A1 | 9/1996 |
| EP | 0767425 A2 | 4/1997 |
| EP | 0 836 137 | 4/1998 |
| EP | 0962856 A2 | 12/1999 |
| WO | WO096/27833 | 12/1996 |
| WO | WO 97/08608 | 3/1997 |
| WO | WO 98/06042 | 2/1998 |

OTHER PUBLICATIONS

Andrew S. Tanenbaum, "Structured Computer Organization", 1976, Prentic-Hall, Inc. pp. 75-87.*

IBM Technical Disclosure Bulletin, "Improved Misaligned Cache Access Using Dual Ports", vol. 39, No. 8, pp. 64-70, Aug. 1996.

IBM Technical Disclosure Bulletin, "Improved Misaligned Cache Access UsingShadow Bits", vol. 39, No. 8, pp. 53-54, Aug. 1996.

IBM Technical Disclosure Bulletin, High Performance Variable-Length Macro Instruction Decode Buffer, vol. 35, No. 1B, pp. 365-366, Jun. 1992.

"Technique for Reducing the Number of Registers Saved at a Context Swap" IBM Technical Disclosure Bulletin, vol. 33, No. 3A, Aug. 1990, pp. 234-235, XP000123918, US, IBM Corp. New York ISSN: 0018-8689.

"Technique to Improve Context Switching Performance in a CPU" IBM Technical Disclosure Bulletin, vol. 33, No. 3B, Aug. 1990, pp. 472-473, XP000124425, US, IBM Corp. New York ISSN: 0018-8689.

"'Allocated Bits' for Machines with Vector Registers" IBM Technical Disclosure Bulletin, vol. 33, No. 3A, Aug. 1990, pp. 310-314, XP000123953, US, IBM Corp. New York ISSN: 0018-8689.

S.W. Keckler and W.J. Dally "Processor Coupling: Integrating Compile Time and Runtime Scheduling for Parallelism", Proceedings of the Annula International Symposium on Computer Ariteture, US, New York, IEEE, vol. SYMP. 19, 1992, pp. 202-213, XP000325804, ISBN: 0-89791-510-6.

M. Fillo et al., "The M-Machine Multicomputer," Proceedings of the Annual International Symposium on Microarchitecture, U.S., Los Alamitos, IEEE Comp. Soc. Press, vol. SYMP. 28, 1995, pp. 146-156, XP000585356 ISBN: 0-8186-7349-4.

M. Berekovic et al.: "Hardware Realization of a Java Virtual Machine For High Performance Multimedia Applications;" 1997 IEEE Workshop on Signal Processing Systems. SIPS 97 Design and Implementation Formerly VLSI Signal Processing, pp. 479-488, XP002139288, 1997, New York, NY, USA, IEEE, USA ISBN 0-7803-3806-5.

D.D. Gajski and B.R. Tulpule "High-Speed Masking Rotator", Digital Processes vol. 4, Jan. 1, 1978, pp. 67-87.

Kazuaki Murakami et al: "SIMO (Single Instruction stream/Multiple instruction Pipelining): A Novel High-speed Single-Processor Architecture" Computer Architecture News, US, Association for Computing Machinery, New Yor. vol. 17, No. 3, Jun. 1, 1989, pp. 78-85, XP000035921.

Steven st al.: "iHARP: a multiple instruction issue processor" IEE Proceedings E. Computers & Digitalk Techniques., vol. 139, No. 5, Sep. 1992, pp. 439-449, XP000319892, Institution of Electrical Engineers. Stevenage., GB ISSN: 1350-2387.

A. Wolfe et al: "A Variable Instruction Stream Extension to the VLIW Architecture" Computer Architecture News, US, Association for Computing Machinery, New York, vol. 19, No. 2, Apr. 1, 1991, pp. 2/14, XP00203245 ISSN: 0163-5964.

Glossner and Vassiliadis: "The DELFT-JAVA Engine: An Introduction" 3rd International Euro-Par Conference, Aug. 26-29, 1997, pp. 29766-29770, XP000901534 Passau, DE.

Mendelson and Mendelson: "Toward a General-Purpose Multi-Stream System" PACT '94: Conference on Parallel Architectures and Compilation Techniques, Aug. 24-26, 1994, pp. 335-338, XP000571393 Montreal, CA.

D.M. Tullsen et al: "Simultaneous Multithreading: Maximizing On-Chip Parallelism" Proceedings of the Annual Symposium on Computer Architecture, US, New York, ACM vol. SYMP. 22, 1995, pp. 392-403, XP000687825 ISBN: 0-7803-3000-5.

Fite, et al.: "Designing a VAX for Hih Performance", Digital Equipment Corporation High Performance Systems; Comp.con90 35th IEEE Computer Society International Conference, Feb. 26-Mar. 26, 1990, San Francisco, USA: IEEE Computer Society Press, XP000146163.

P.A. Findlay et al: "HARP: A VLIW RISC Processor", Proceedings of the Advanced Computer Technology, Reliable Systems and Applications 5th Annual European Computer Conference, Bologna, May 13-16, 1991:IEEE Computer Society Press: ISBN 0-8186-2141-9.

Yim et al., "Single Cycle Access Cache for the Misaligned Data and Instruction Prefetch," Proceedings for the ASP-DAC 97 Asia and South Pacific Design Automation Conference, pp. 677-678, Jan. 28-31, 1997.

* cited by examiner

IMPLICITLY DERIVED REGISTER SPECIFIERS IN A PROCESSOR

BACKGROUND OF THE INVENTION

1. Field of the Invention

The present invention relates to instruction execution elements of a processor. More specifically, the present invention relates to the instruction execution elements of a Very Long Instruction Word (VLIW) processor including control elements that define and supply register specifiers.

2. Description of the Related Art

One technique for improving the performance of processors is parallel execution of multiple instructions to allow the instruction execution rate to exceed the clock rate. Various types of parallel processors have been developed including Very Long Instruction Word (VLIW) processors that use multiple, independent functional units to execute multiple instructions in parallel. VLIW processors package multiple operations into one very long instruction, the multiple operations being determined by sub-instructions that are applied to the independent functional units. An instruction has a set of fields corresponding to each functional unit. Typical bit lengths of a subinstruction commonly range from 16 to 24 bits per functional unit to produce an instruction length often in a range from 112 to 168 bits.

The multiple functional units are kept busy by maintaining a code sequence with sufficient operations to keep instructions scheduled. A VLIW processor often uses a technique called trace scheduling to maintain scheduling efficiency by unrolling loops and scheduling code across basic function blocks. Trace scheduling also improves efficiency by allowing instructions to move across branch points.

Limitations of VLIW processing include limited parallelism, limited hardware resources, and a vast increase in code size. A limited amount of parallelism is available in instruction sequences. Unless loops are unrolled a very large number of times, insufficient operations are available to fill the instructions. Limited hardware resources are a problem, not only because of duplication of functional units but more importantly due to a large increase in memory and register file bandwidth. A large number of read and write ports are necessary for accessing the register file, imposing a bandwidth that is difficult to support without a large cost in the size of the register file and degradation in clock speed. As the number of ports increases, the complexity of the memory system further increases. To allow multiple memory accesses in parallel, the memory is divided into multiple banks having different addresses to reduce the likelihood that multiple operations in a single instruction have conflicting accesses that cause the processor to stall since synchrony must be maintained between the functional units.

Code size is a problem for several reasons. The generation of sufficient operations in a nonbranching code fragment requires substantial unrolling of loops, increasing the code size. Also, instructions that are not full include unused subinstructions that waste code space, increasing code size. Furthermore, the increase in the size of storages such as the register file increase the number of bits in the instruction for addressing registers in the register file.

A register file with a large number of registers is often used to increase performance of a VLIW processor. A VLIW processor is typically implemented as a deeply pipelined engine with an "in-order" execution model. To attain a high performance a large number of registers is utilized so that the multiple functional units are busy as often as possible.

A large register file has several drawbacks. First, as the number of registers that are directly addressable is increased, the number of bits used in the instruction also increases. For a rich instruction set architecture with, for example, four register specifiers, an additional bit for a register specifier effectively costs four bits in the instruction (one bit per register specifier). Second, a register file with many registers occupies a large area. Third, a register file with many registers may create critical timing paths and therefore limit the cycle time of the processor.

Many powerful instructions utilize multiple register specifiers. For example, a multiply and add instruction (muladd) utilizes four register specifiers including two source operands that are multiplied, a third source operand that is added to the product of the multiplication, and a destination register to receive the result of the addition. Register specifiers are costly due to a large consumption of instruction word bits. For example, a large register file in a VLIW processor may include 128 or more registers that are specified in seven or more bits. Typically the instruction word is limited in size, for example to 32 bits per subinstruction. A 32 bit subinstruction with four register specifiers of seven bits would have 28 bits used for register specification alone, leaving only four bits to specify an operation code and supply other coding. Accordingly, the large number of register specifiers in combination with a limited instruction size constrains the power and flexibility of the processor.

What is needed is a technique and processor architecture enhancement that improves the efficiency of instruction coding and reduces the bit resource allocation within an instruction word that is dedicated to register specification.

SUMMARY OF THE INVENTION

A processor executes an instruction set including instructions in which a register specifier is implicitly derived, based on another register specifier. One technique for implicitly deriving a register specifier is to add or subtract one from a specifically-defined register specifier. Implicit derivation of a register specifier is selectively implemented for some opcodes. One example which may be implemented in some embodiments is a multiply and add instruction muladd which is encoded as follows:

muladd rs1, rs2, rd, which performs an operation specified by the equation:

$$rd=(rs1*[rs1+1])+rs2.$$

The term [rs1+1] designates data contained within the register following the explicitly-defined register rs1. For example, if rs1 is set to specify a register r2, rs2 is set to specify a register r19, and rd is set to specify a register r22, then the instruction is, as follows:

muladd r2, r19, r22, which performs an operation specified by the equation:

$$r22=(r2*r3)+r19.$$

Some processor embodiments may support another instruction that includes implicitly-derived register specifiers, a bit extract instruction:

bitext r10, r45, r77, which generates a read of registers r10, r11, and r45, and a write of register r77. Register r11 is derived automatically without consuming seven bits of the instruction field.

In some embodiments, a decoder decodes instructions that use implicitly-derived register specifiers and reads the explicitly-defined register. The decoder generates pointers both to the explicitly-defined register and to the implicitly-derived register. In other embodiments, a pointer to registers within a register file includes an additional bit indicating that a register read is accompanied by a read of an implicitly-derived register. When the bit indicates selection of the implicitly-derived register specifier, the register file generates two pointers, one directed to the explicitly-specified register and a second directed to the implicitly-derived register.

BRIEF DESCRIPTION OF THE DRAWINGS

The features of the described embodiments are specifically set forth in the appended claims. However, embodiments of the invention relating to both structure and method of operation, may best be understood by referring to the following description and accompanying drawings.

The use of the same reference symbols in different drawings indicates similar or identical items.

DESCRIPTION OF THE EMBODIMENT(S)

Figure 1:
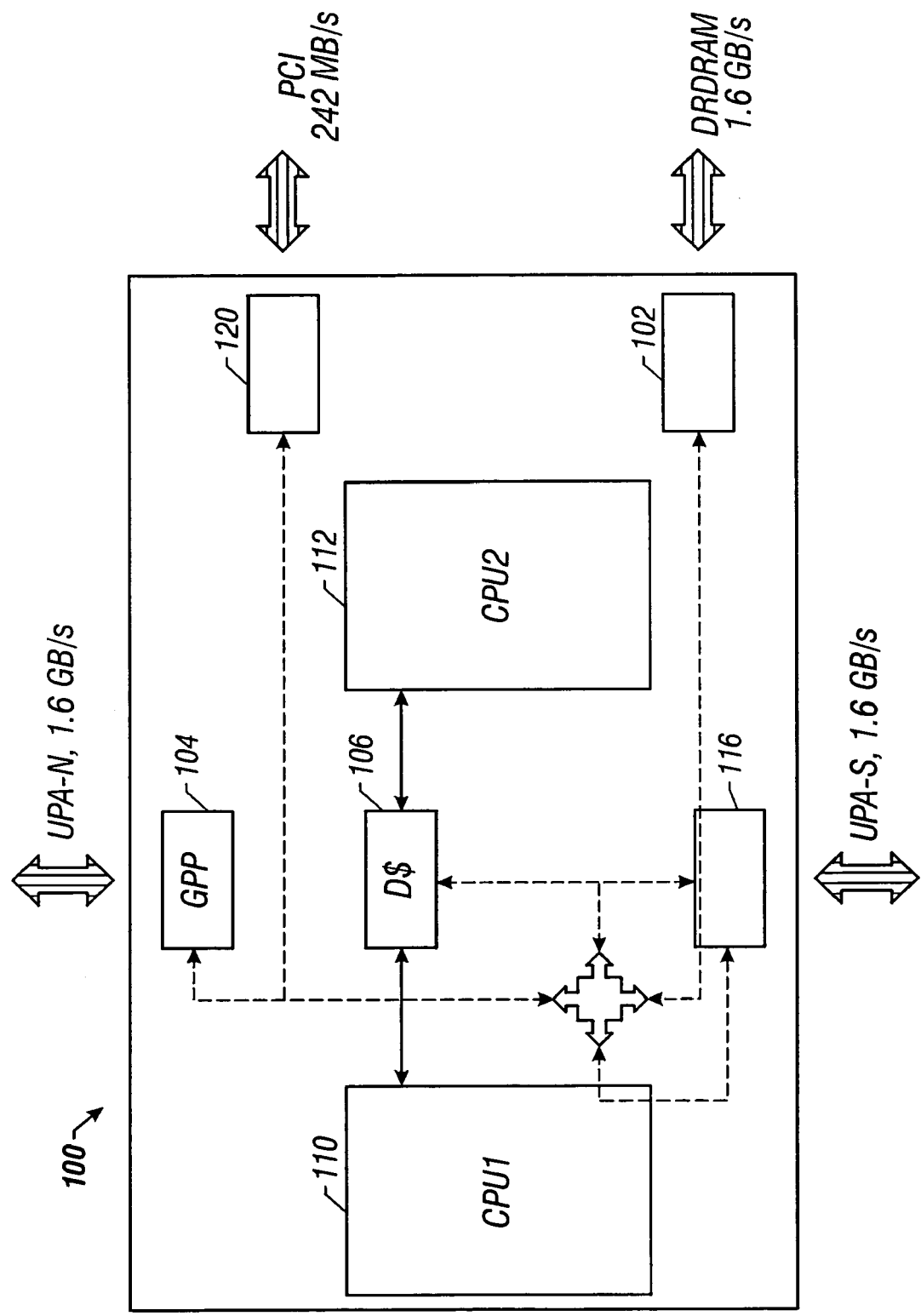
FIG. 1 is a schematic block diagram illustrating a single integrated circuit chip implementation of a processor in accordance with an embodiment of the present invention.

Referring to FIG. 1, a schematic block diagram illustrates a single integrated circuit chip implementation of a processor 100 that includes a memory interface 102, a geometry decompressor 104, two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include a an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

The UPA controller 116 is a custom interface that attains a suitable balance between high-performance computational and graphic subsystems. The UPA is a cache-coherent, processor-memory interconnect. The UPA attains several advantageous characteristics including a scaleable bandwidth through support of multiple bused interconnects for data and addresses, packets that are switched for improved bus utilization, higher bandwidth, and precise interrupt processing. The UPA performs low latency memory accesses with high throughput paths to memory. The UPA includes a buffered cross-bar memory interface for increased bandwidth and improved scaleability. The UPA supports high-performance graphics with two-cycle single-word writes on the 64-bit UPA interconnect. The UPA interconnect architecture utilizes point-to-point packet switched messages from a centralized system controller to maintain cache coherence. Packet switching improves bus bandwidth utilization by removing the latencies commonly associated with transaction-based designs.

The PCI controller 120 is used as the primary system I/O interface for connecting standard, high-volume, low-cost peripheral devices, although other standard interfaces may also be used. The PCI bus effectively transfers data among high bandwidth peripherals and low bandwidth peripherals, such as CD-ROM players, DVD players, and digital cameras.

Two media processing units 110 and 112 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 100 is an eight-wide machine with eight execution units for executing instructions. A typical "general-purpose" processing code has an instruction level parallelism of about two so that, on average, most (about six) of the eight execution units would be idle at any time. The illustrative processor 100 employs thread level parallelism and operates on two independent threads, possibly attaining twice the performance of a processor having the same resources and clock rate but utilizing traditional non-thread parallelism.

Thread level parallelism is particularly useful for Java™ applications which are bound to have multiple threads of execution. Java™ methods including "suspend", "resume", "sleep", and the like include effective support for threaded program code. In addition, Java™ class libraries are thread-safe to promote parallelism. (Java™, Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.) Furthermore, the thread model of the processor 100 supports a dynamic compiler which runs as a separate thread using one media processing unit 110 while the second media processing unit 112 is used by the current application. In the illustrative system, the compiler applies optimizations based on "on-the-fly" profile feedback information while dynamically modifying the executing code to improve execution on each subsequent run. For example, a "garbage collector" may be executed on a first media processing unit 110, copying objects or gathering pointer information, while the application is executing on the other media processing unit 112.

Although the processor 100 shown in FIG. 1 includes two processing units on an integrated circuit chip, the architecture is highly scaleable so that one to several closely-coupled processors may be formed in a message-based coherent architecture and resident on the same die to process multiple threads of execution. Thus, in the processor 100, a limitation on the number of processors formed on a single die thus arises from capacity constraints of integrated circuit technology rather than from architectural constraints relating to the interactions and interconnections between processors.

Figure 2:
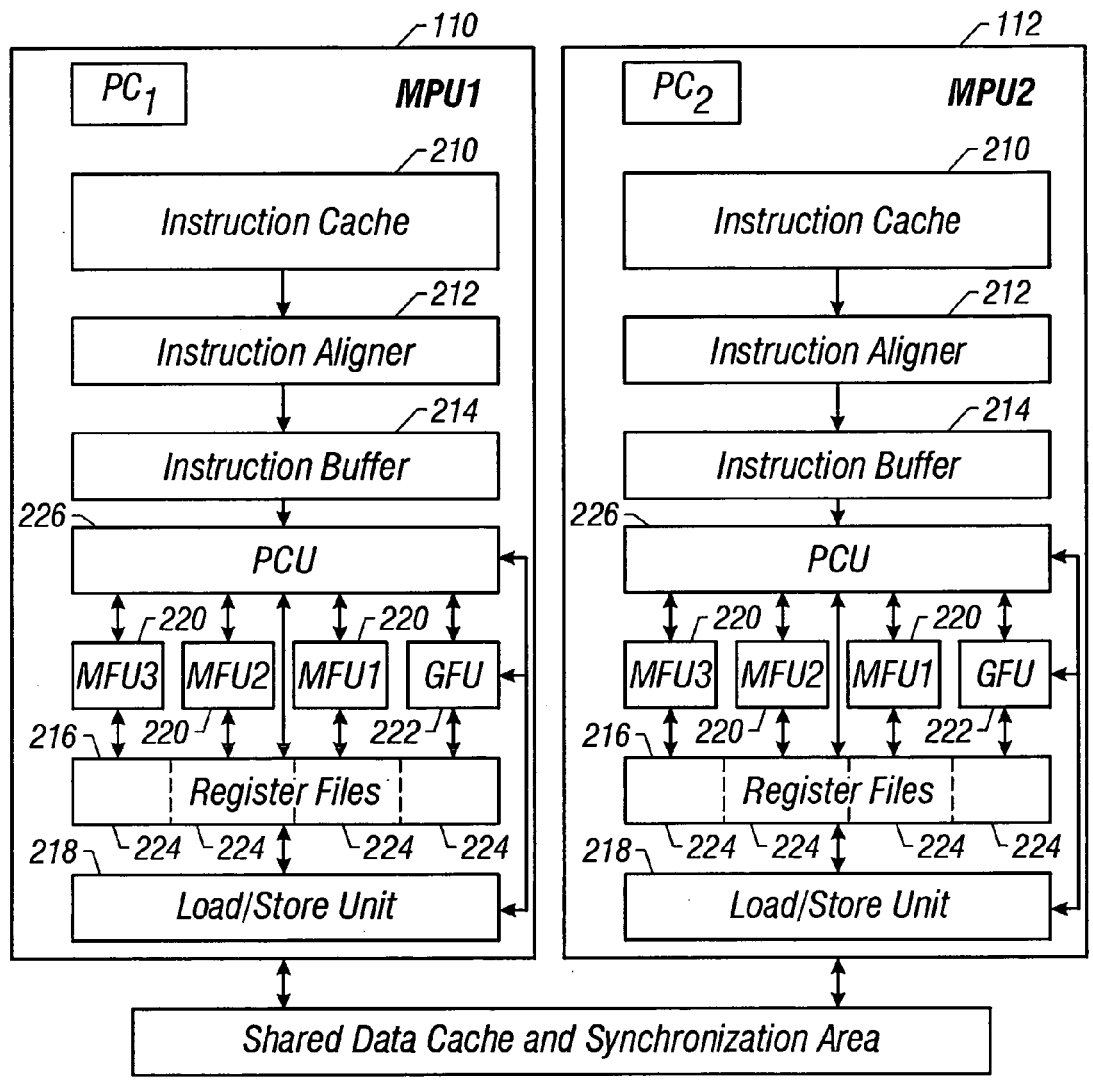
FIG. 2 is a schematic block diagram showing the core of the processor.

Referring to FIG. 2, a schematic block diagram shows the core of the processor 100. The media processing units 110 and 112 each include an instruction cache 210, an instruction aligner 212, an instruction buffer 214, a pipeline control unit 226, a split register file 216, a plurality of execution units, and a load/store unit 218. In the illustrative processor 100, the media processing units 110 and 112 use a plurality of execution units for executing instructions. The execution units for a media processing unit 110 include three media functional units (MFU) 220 and one general functional unit (GFU) 222. The media functional units 220 are multiple single-instruction-multiple-datapath (MSIMD) media functional units. Each of the media functional units 220 is capable of processing parallel 16-bit components. Various parallel 16-bit operations supply the single-instruction-multiple-datapath capability for the processor 100 including add, multiply-add, shift, compare, and the like. The media functional units 220 operate in combination as tightly-coupled digital signal processors (DSPs). Each media functional unit 220 has an separate and individual sub-instruction stream, but all three media functional units 220 execute synchronously so that the subinstructions progress lock-step through pipeline stages.

The general functional unit 222 is a RISC processor capable of executing arithmetic logic unit (ALU) operations, loads and stores, branches, and various specialized and esoteric functions such as parallel power operations, reciprocal square root operations, and many others. The general functional unit 222 supports less common parallel operations such as the parallel reciprocal square root instruction.

The illustrative instruction cache 210 has a 16 Kbyte capacity and includes hardware support to maintain coherence, allowing dynamic optimizations through self-modifying code. Software is used to indicate that the instruction storage is being modified when modifications occur. The 16K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" instructions store2i. Software uses the store2i instruction to maintain coherency with the instruction cache 210 so that the instruction caches 210 do not have to be snooped on every single store operation issued by the media processing unit 110.

The pipeline control unit 226 is connected between the instruction buffer 214 and the functional units and schedules the transfer of instructions to the functional units. The pipeline control unit 226 also receives status signals from the functional units and the load/store unit 218 and uses the status signals to perform several control functions. The pipeline control unit 226 maintains a scoreboard, generates stalls and bypass controls. The pipeline control unit 226 also generates traps and maintains special registers.

Each media processing unit 110 and 112 includes a split register file 216, a single logical register file including 128 thirty-two bit registers. The split register file 216 is split into a plurality of register file segments 224 to form a multi-ported structure that is replicated to reduce the integrated circuit die area and to reduce access time. A separate register file segment 224 is allocated to each of the media functional units 220 and the general functional unit 222. In the illustrative embodiment, each register file segment 224 has 128 32-bit registers. The first 96 registers (0–95) in the register file segment 224 are global registers. All functional units can write to the 96 global registers. The global registers are coherent across all functional units (MFU and GFU) so that any write operation to a global register by any functional unit is broadcast to all register file segments 224. Registers 96–127 in the register file segments 224 are local registers. Local registers allocated to a functional unit are not accessible or "visible" to other functional units.

The media processing units 110 and 112 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 222 and from zero to three instructions that execute in the media functional units (MFU) 220. A MFU instruction field within the VLIW instruction word includes an operation code (opcode) field, three source register (or immediate) fields, and one destination register field.

Instructions are executed in-order in the processor 100 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

To avoid software scheduling errors, the media processing units 110 and 112 are high-performance but simplified with respect to both compilation and execution. The media processing units 110 and 112 are most generally classified as a simple 2-scalar execution engine with full bypassing and hardware interlocks on load operations. The instructions include loads, stores, arithmetic and logic (ALU) instructions, and branch instructions so that scheduling for the processor 100 is essentially equivalent to scheduling for a simple 2-scalar execution engine for each of the two media processing units 110 and 112.

The processor 100 supports full bypasses between the first two execution units within the media processing unit 110 and 112 and has a scoreboard in the general functional unit 222 for load operations so that the compiler does not need to handle nondeterministic latencies due to cache misses. The processor 100 scoreboards long latency operations that are executed in the general functional unit 222, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 222 or the first media functional unit 220, then the stall only endures until the result is available for intra-unit bypass. For the case of a load instruction that hits in the data cache 106, the stall may last only one cycle. If the referencing instruction is on the second or third media functional units 220, then the stall endures until the result reaches the writeback stage in the pipeline where the result is bypassed in transmission to the split register file 216.

The scoreboard automatically manages load delays that occur during a load hit. In an illustrative embodiment, all loads enter the scoreboard to simplify software scheduling and eliminate NOPs in the instruction stream.

The scoreboard is used to manage most interlocks between the general functional unit 222 and the media functional units 220. All loads and non-pipelined long-latency operations of the general functional unit 222 are scoreboarded. The long-latency operations include division idiv,fdiv instructions, reciprocal square root frecsqrt, precsqrt instructions, and power ppower instructions. None of the results of the media functional units 220 is scoreboarded. Non-scoreboarded results are available to subsequent operations on the functional unit that produces the results following the latency of the instruction.

The illustrative processor 100 has a rendering rate of over fifty million triangles per second without accounting for operating system overhead. Therefore, data feeding specifications of the processor 100 are far beyond the capabilities of cost-effective memory systems. Sufficient data bandwidth is achieved by rendering of compressed geometry using the geometry decompressor 104, an on-chip real-time geometry decompression engine. Data geometry is stored in main memory in a compressed format. At render time, the data geometry is fetched and decompressed in real-time on the integrated circuit of the processor 100. The geometry decompressor 104 advantageously saves memory space and memory transfer bandwidth. The compressed geometry uses an optimized generalized mesh structure that explicitly calls out most shared vertices between triangles, allowing the processor 100 to transform and light most vertices only once. In a typical compressed mesh, the triangle throughput of the transform-and-light stage is increased by a factor of four or more over the throughput for isolated triangles. For example, during processing of triangles, multiple vertices are operated upon in parallel so that the utilization rate of resources is high, achieving effective spatial software pipelining. Thus operations are overlapped in time by operating on several vertices simultaneously, rather than overlapping several loop iterations in time. For other types of applications with high instruction level parallelism, high trip count loops are software-pipelined so that most media functional units 220 are fully utilized.

Figure 3:
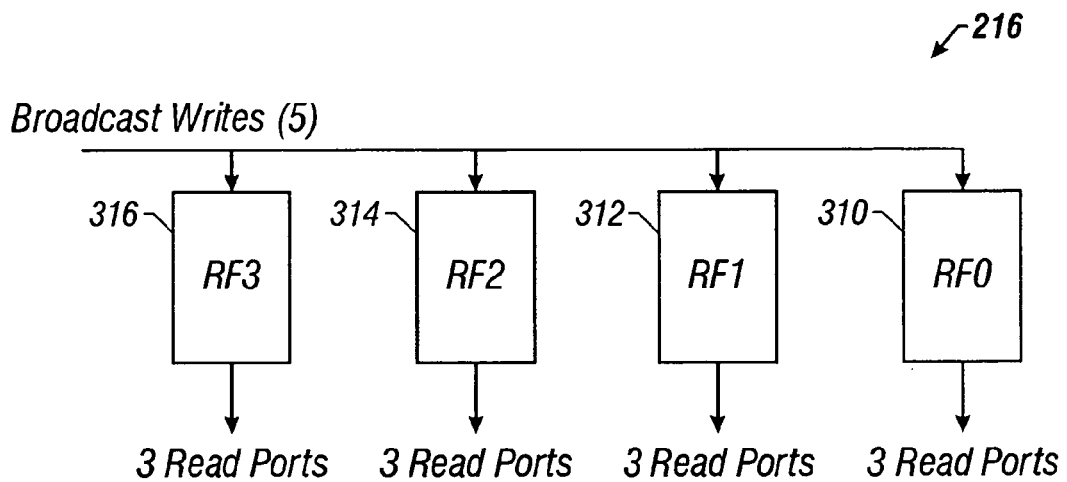
FIG. 3 is a schematic block diagram that illustrates an embodiment of the split register file that is suitable for usage in the processor.

Referring to FIG. 3, a schematic block diagram illustrates an embodiment of the split register file 216 that is suitable for usage in the processor 100. The split register file 216 supplies all operands of processor instructions that execute in the media functional units 220 and the general functional units 222 and receives results of the instruction execution from the execution units. The split register file 216 operates as an interface to the geometry decompressor 104. The split register file 216 is the source and destination of store and load operations, respectively.

In the illustrative processor 100, the split register file 216 in each of the media processing units 110 and 112 has 128 registers. Graphics processing places a heavy burden on register usage. Therefore, a large number of registers is supplied by the split register file 216 so that performance is not limited by loads and stores or handling of intermediate results including graphics "fills" and "spills". The illustrative split register file 216 includes twelve read ports and five write ports, supplying total data read and write capacity between the central registers of the split register file 216 and all media functional units 220 and the general functional unit 222. The five write ports include one 64-bit write port that is dedicated to load operations. The remaining four write ports are 32 bits wide and are used to write operations of the general functional unit 222 and the media functional units 220.

Total read and write capacity promotes flexibility and facility in programming both of hand-coded routines and compiler-generated code.

Large, multiple-ported register files are typically metal-limited so that the register area is proportional with the square of the number of ports. A sixteen port file is roughly proportional in size and speed to a value of 256. The illustrative split register file 216 is divided into four register file segments 310, 312, 314, and 316, each having three read ports and four write ports so that each register file segment has a size and speed proportional to 49 for a total area for the four segments that is proportional to 196. The total area is therefore potentially smaller and faster than a single central register file. Write operations are filly broadcast so that all files are maintained coherent. Logically, the split register file 216 is no different from a single central register file However, from the perspective of layout efficiency, the split register file 216 is highly advantageous, allowing for reduced size and improved performance.

The new media data that is operated upon by the processor 100 is typically heavily compressed. Data transfers are communicated in a compressed format from main memory and input/output devices to pins of the processor 100, subsequently decompressed on the integrated circuit holding the processor 100, and passed to the split register file 216.

Splitting the register file into multiple segments in the split register file 216 in combination with the character of data accesses in which multiple bytes are transferred to the plurality of execution units concurrently, results in a high utilization rate of the data supplied to the integrated circuit chip and effectively leads to a much higher data bandwidth than is supported on general-purpose processors. The highest data bandwidth requirement is therefore not between the input/output pins and the central processing units, but is rather between the decompressed data source and the remainder of the processor. For graphics processing, the highest data bandwidth requirement is between the geometry decompressor 104 and the split register file 216. For video decompression, the highest data bandwidth requirement is internal to the split register file 216. Data transfers between the geometry decompressor 104 and the split register file 216 and data transfers between various registers of the split register file 216 can be wide and run at processor speed, advantageously delivering a large bandwidth.

The register file 216 is a focal point for attaining the very large bandwidth of the processor 100. The processor 100 transfers data using a plurality of data transfer techniques. In one example of a data transfer technique, cacheable data is loaded into the split register file 216 through normal load operations at a low rate of up to eight bytes per cycle. In another example, streaming data is transferred to the split register file 216 through group load operations which transfer thirty-two bytes from memory directly into eight consecutive 32-bit registers. The processor 100 utilizes the streaming data operation to receive compressed video data for decompression.

Compressed graphics data is received via a direct memory access (DMA) unit in the geometry decompressor 104. The compressed graphics data is decompressed by the geometry decompressor 104 and loaded at a high bandwidth rate into the split register file 216 via group load operations that are mapped to the geometry decompressor 104.

Load operations are non-blocking and scoreboarded so that a long latency inherent to loads can be hidden by early scheduling.

General purpose applications often fail to exploit the large register file 216. Statistical analysis shows that compilers do not effectively use the large number of registers in the split register file 216. However, aggressive in-lining techniques that have traditionally been restricted due to the limited number of registers in conventional systems may be advantageously used in the processor 100 to exploit the large number of registers in the split register file 216. In a software system that exploits the large number of registers in the processor 100, the complete set of registers is saved upon the event of a thread (context) switch. When only a few registers of the entire set of registers is used, saving all registers in the full thread switch is wasteful. Waste is avoided in the processor 100 by supporting individual marking of registers. Octants of the thirty-two registers can be marked as "dirty" if used, and are consequently saved conditionally.

In various embodiments, the split register file 216 is leveraged by dedicating fields for globals, trap registers, and the like.

Figure 4:
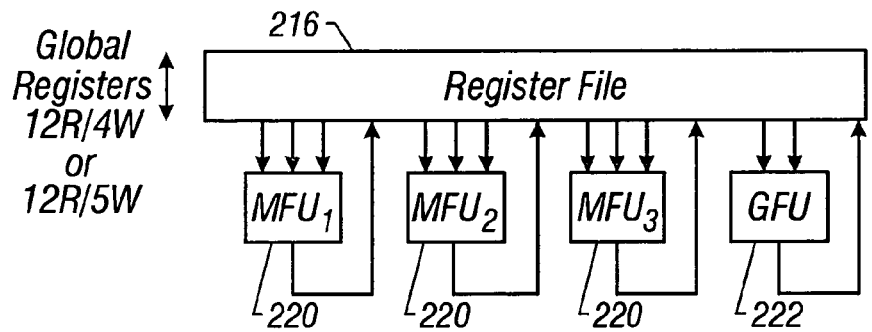
FIG. 4 is a schematic block diagram that shows a logical view of the register file and functional units in the processor.

Referring to FIG. 4, a schematic block diagram shows a logical view of the register file 216 and functional units in the processor 100. The physical implementation of the core processor 100 is simplified by replicating a single functional unit to form the three media functional units 220. The media functional units 220 include circuits that execute various arithmetic and logical operations including general-purpose code, graphics code, and video-image-speech (VIS) processing. VIS processing includes video processing, image processing, digital signal processing (DSP) loops, speech processing, and voice recognition algorithms, for example.

Figure 5A:
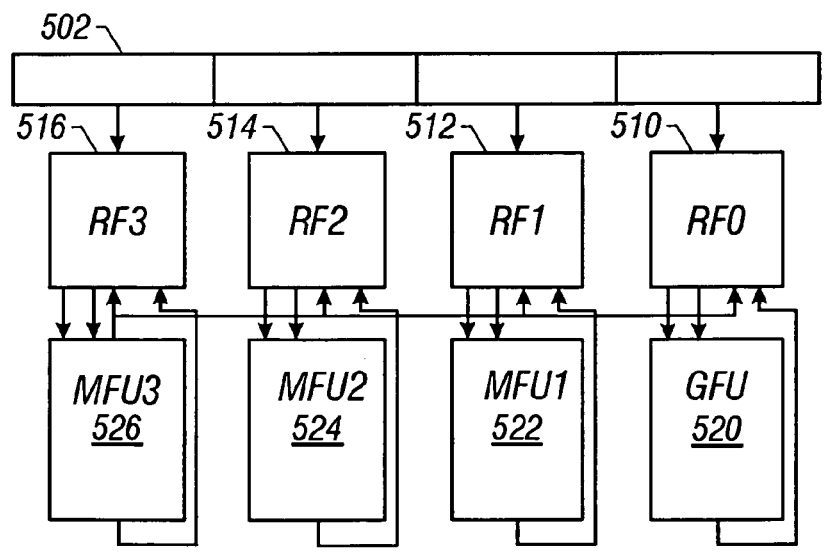
FIGS. 5A, 5B, and 5C show a schematic block diagram of a divided or split register file, a high level view of computation elements of a functional unit, and a pictorial view of an instruction format, respectively, which are used to illustrate the difficulty of defining an instruction format with a limited number of instruction bits.
Figure 5B:
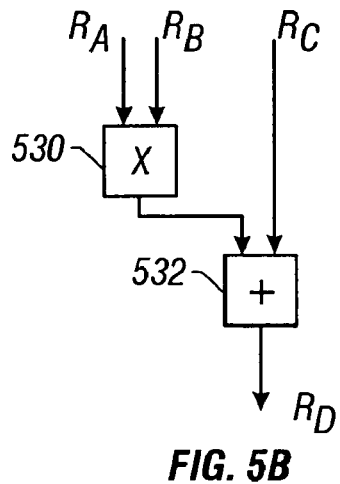
Figure 5C:
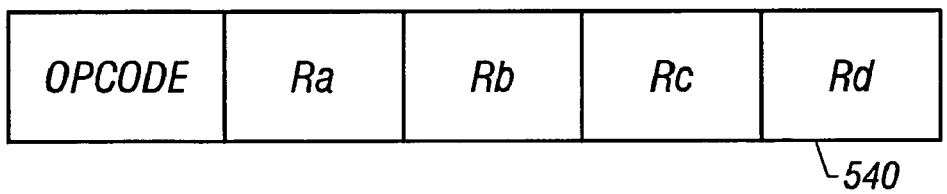

Referring to FIGS. 5A, 5B, and 5C, a schematic block diagram of a divided or split register file, a high level view of computation elements of a functional unit, and a pictorial view of an instruction format, respectively are used to illustrate the difficulty of defining an instruction format with a limited number of instruction bits. FIG. 5A shows a schematic block diagram of a decoder 502 that decodes four subinstructions of a very long instruction word. Each of the four decoders applies control signals to one of four register file segments 510, 512, 514, and 516. Each of the register file segments is coupled to and associated with a functional unit. In the illustrative embodiment, a first register file segment 510 is coupled to and associated with a general functional unit 520. Second, third, and fourth register file segments 512, 514, and 516 are respectively coupled to and associated with media functional units 522, 524, and 526.

FIG. 5B shows an example of a VLIW subinstruction, specifically a multiply-add (muladd) instruction and relates execution of the muladd instruction to computation blocks in a functional unit. The muladd instruction specifies four register specifiers designating data that is operated upon by the functional unit. The muladd instruction specifies three source operands $R_A$, $R_B$, and $R_C$, and one destination operand $R_D$. The functional unit includes a multiplier 530 that multiplies the source operands $R_A$ and $R_B$ to generate a product. The functional unit also includes an adder 532 that receives the product from the multiplier 530 and adds the product and the source operand $R_C$ to produce a sum that is transferred to the destination register operand $R_D$.

For a register file in which the register file segments include $N=2^M$ registers, for example, M bits are used to uniquely specify a particular register so that 4*M are needed to uniquely specify the four registers addressed in a single subinstruction.

FIG. 5C depicts a subinstruction storage for instructions such as the muladd instruction. Resource size and speed constraints are imposed on instruction storage so that the number of bits in a subinstruction are limited. The four register specifiers for the subinstruction use nearly the entire capacity of the subinstruction storage. For example, a register file segment that includes 128 bits has registers that are uniquely addressed using seven address bits. Addressing of four registers consumes 7*4=28 bits. For a subinstruction size constrained to 32 bits, only four bits remain for specifying an operation code or other operational information for controlling execution.

The illustrative VLIW processor partitions the register file into local and global registers to conserve address bits in a very long instruction word.

Figure 6:
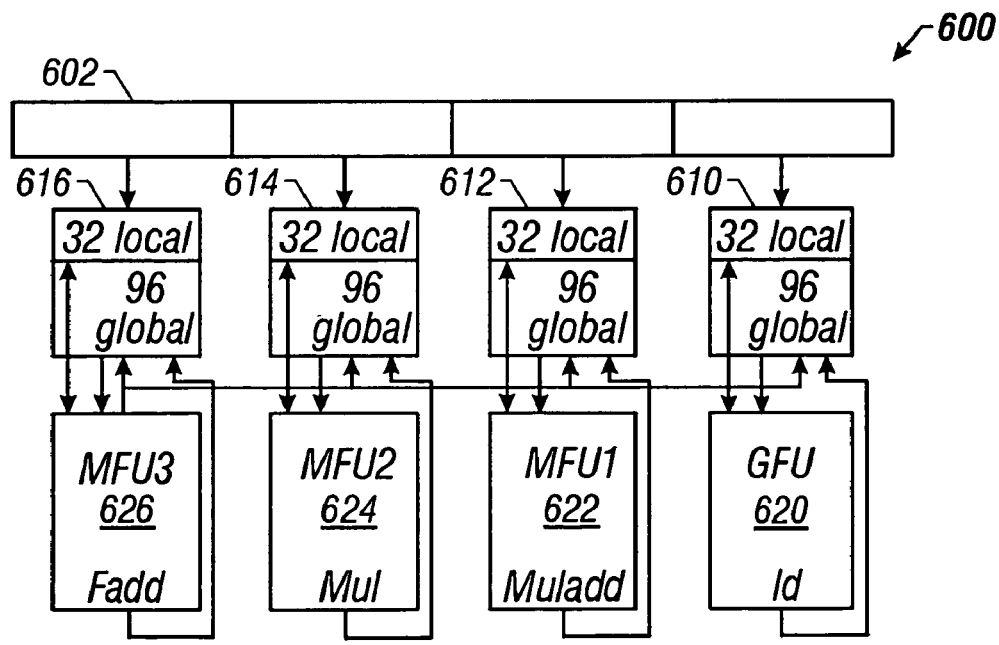
FIG. 6 is a schematic block diagram showing a register file for a VLIW processor that includes global and local register partitioning.

Referring to FIG. 6, a schematic block diagram shows a register file 600 for a VLIW processor 100 that supports implicitly-derived register specifiers. The Very Long Instruction Word (VLIW) processor has a decoder 602 that decodes instructions for execution in a plurality of functional units including three media functional units 622, 624, and 626, and a general functional unit 620. The processor 100 also includes a multi-ported register file 600 that is divided into a plurality of separate register file segments 610, 612, 614, and 616, each of the register file segments being associated to one of the plurality of functional units.

For some subinstructions, a register specifier is implicitly derived, typically based on another register specifier. One simple technique for implicitly deriving a register specifier is to add or subtract one from a specifically-defined register specifier. Implicit derivation of a register specifier is selectively implemented for some opcodes. One example, which may be implemented in some processor embodiments, is a multiply and add instruction muladd which is encoded as follows:

muladd rs1, rs2, rd, which performs an operation specified by the equation:

$rd=(rs1*[rs1+1])+rs2,$ in which the term [rs1+1] designates data contained within the register following the explicitly-defined register rs1. For example, if rs1 is set to specify a register r2, rs2 is set to specify a register r19, and rd is set to specify a register r22, then the instruction is, as follows:

muladd r2, r19, r22, which performs an operation specified by the equation:

$r22=(r2*r3)+r19.$

Another instruction that may include implicitly-derived register specifiers in some processor embodiments is a bit extract instruction:

bitext r10, r45, r77, which generates a read of registers r10, r11, and r45, and a write of register r77. Register r11 is derived automatically without consuming seven bits of the instruction field.

In some embodiments, the decoder 602 decodes instructions that use implicitly-derived register specifiers and reads the explicitly-defined register. The decoder 602 then generates pointers both to the explicitly-defined register and to the implicitly-derived register. In other embodiments, a pointer to registers within the register file segments 610, 612, 614, and 616 includes an additional bit indicating that a register read is accompanied by a read of an implicitly-derived register.

Figure 7:
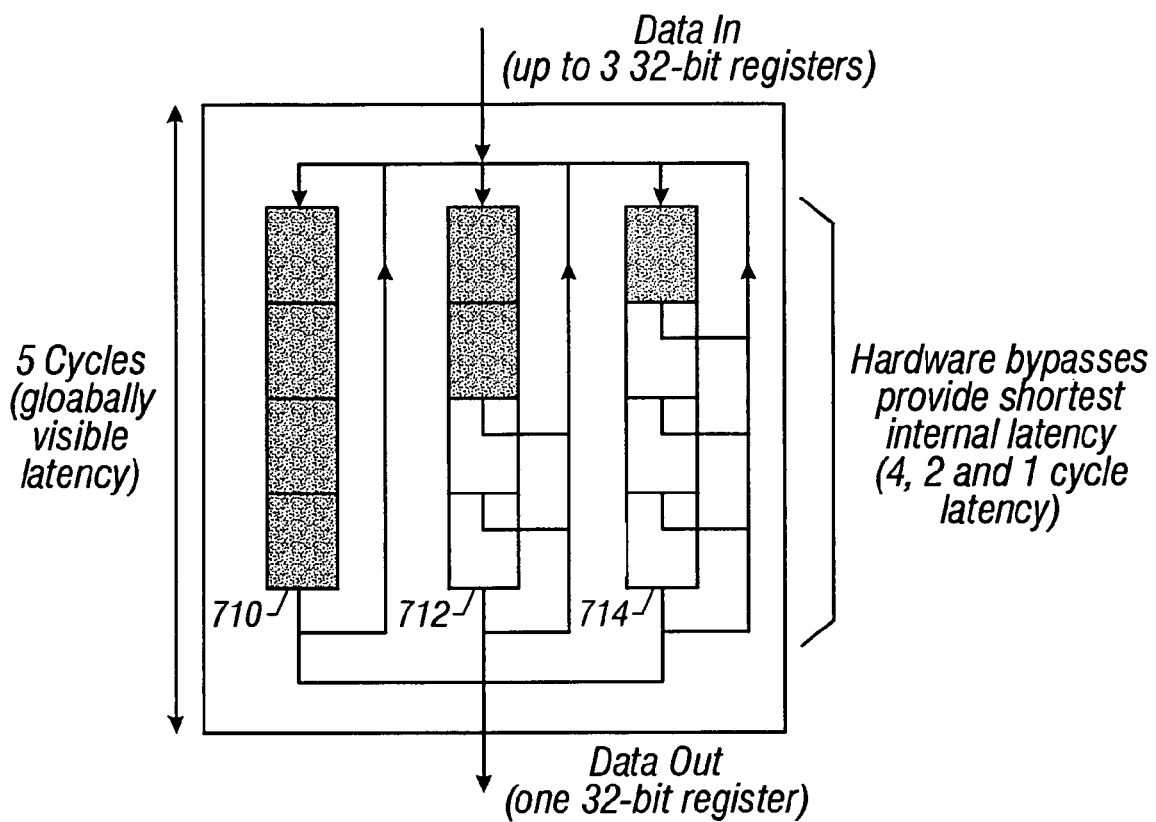
FIG. 7 is a pictorial schematic diagram depicting an example of instruction execution among a plurality of media functional units.

Referring to FIG. 7, a simplified pictorial schematic diagram depicts an example of instruction execution among a plurality of media functional units 220. Results generated by various internal function blocks within a first individual media functional unit are immediately accessible internally to the first media functional unit 710 but are only accessible globally by other media functional units 712 and 714 and by the general functional unit five cycles after the instruction enters the first media functional unit 710, regardless of the actual latency of the instruction. Therefore, instructions executing within a functional unit can be scheduled by software to execute immediately, taking into consideration the actual latency of the instruction. In contrast, software that schedules instructions executing in different functional units is expected to account for the five cycle latency. In the diagram, the shaded areas represent the stage at which the pipeline completes execution of an instruction and generates final result values. A result is not available internal to a functional unit a final shaded stage completes. In the example, media processing unit instructions have three different latencies—four cycles for instructions such as fmuladd and fadd, two cycles for instructions such as pmuladd, and one cycle for instructions like padd and xor.

Although internal bypass logic within a media functional unit 220 forwards results to execution units within the same media functional unit 220, the internal bypass logic does not detect incorrect attempts to reference a result before the result is available.

Software that schedules instructions for which a dependency occurs between a particular media functional unit, for example 712, and other media functional units 710 and 714, or between the particular media functional unit 712 and the general functional unit 222, is to account for the five cycle latency between entry of an instruction to the media functional unit 712 and the five cycle pipeline duration.

Figure 8:
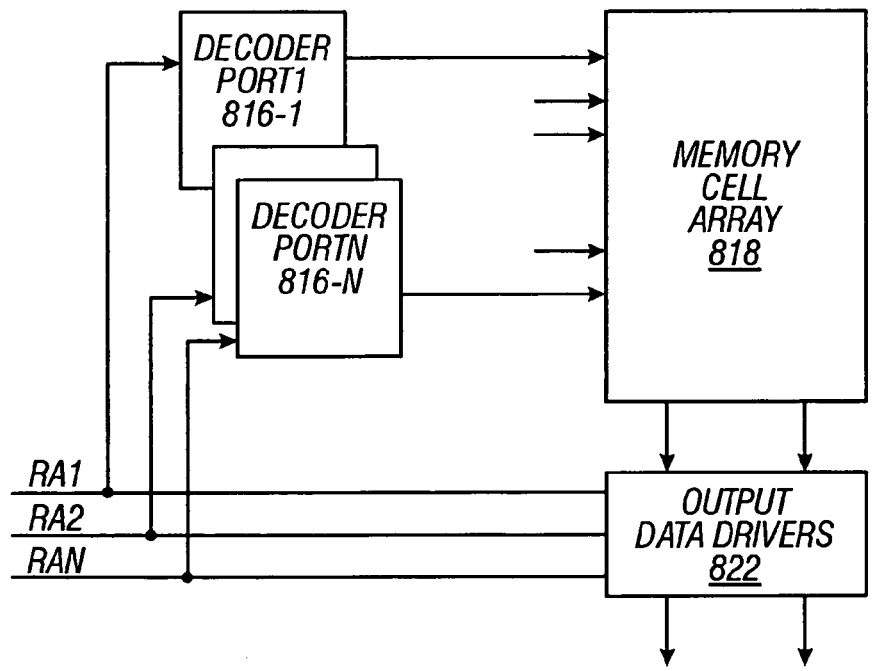
FIG. 8 illustrates a schematic block diagram of an SRAM array used for the multi-port split register file.

Referring to FIG. 8, a schematic block diagram depicts an embodiment of the multiport register file 216. A plurality of read address buses RA1 through RAN carry read addresses that are applied to decoder ports 816-1 through 816-N, respectively. Decoder circuits are well known to those of ordinary skill in the art, and any of several implementations could be used as the decoder ports 816-1 through 816-N. When an address is presented to any of decoder ports 816-1 through 816-N, the address is decoded and a read address signal is transmitted by a decoder port 816 to a register in a memory cell array 818. Data from the memory cell array 818 is output using output data drivers 822. Data is transferred to and from the memory cell array 818 under control of control signals carried on some of the lines of the buses of the plurality of read address buses RA1 through RAN.

Figure 9:
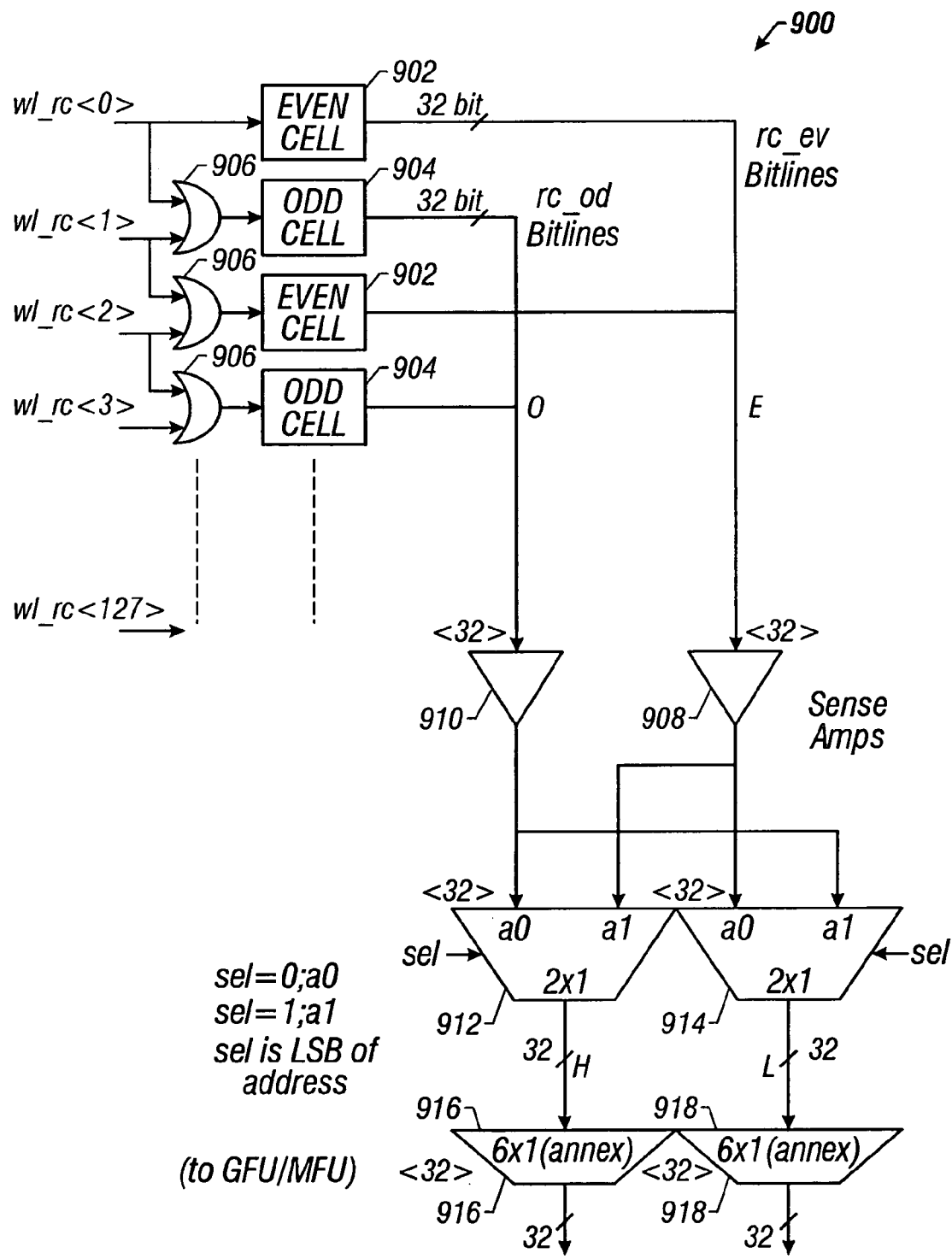
FIG. 9 is a schematic block diagram that illustrates a read circuit operating in conjunction with a decoder or a register file for generating implicitly-derived register specifiers.

Referring to FIG. 9, a schematic block diagram illustrates a read circuit 900 that may be implemented within a decoder or a register file for generating implicitly-derived register specifiers. The read circuit 900 receives activation signals wl_rc<n> for each of N registers. In the illustrative example, the register file include 128 registers. The activation signals wl_rc<n> are applied as input signals to N storage cells including N/2 even cells 902 and N/2 odd cells 904. The activation signals wl_rc<n> are applied to the storage cells via OR gates 906. The OR-gates 906 generate a select signal to a storage cell if either the storage cell is addresses or the previous storage cell is addressed.

When a storage cell is activated by the activation signals wl_rc<n>, the storage cell generates data signals on bitlines. The even cells 902 generate data signals that are applied to even sense amplifiers 908 via even bitlines rc_ev. The odd cells 904 generate data signals that are applied to odd sense amplifiers 910 via odd bitlines rc_od. Amplified signals are multiplexed at multiplexers 912 and 914 and respectively applied to a high annex 916 and a low annex 918. The annexes supply signals to the general functional unit 222 or media functional units 220. The read circuit 900 controls a 64-bit read operation from a read port that reads registers rs1 and rs1+1, and controls a 32-bit read operation from a read port, reading bits<31:0> from register rs1.

Figure 10:
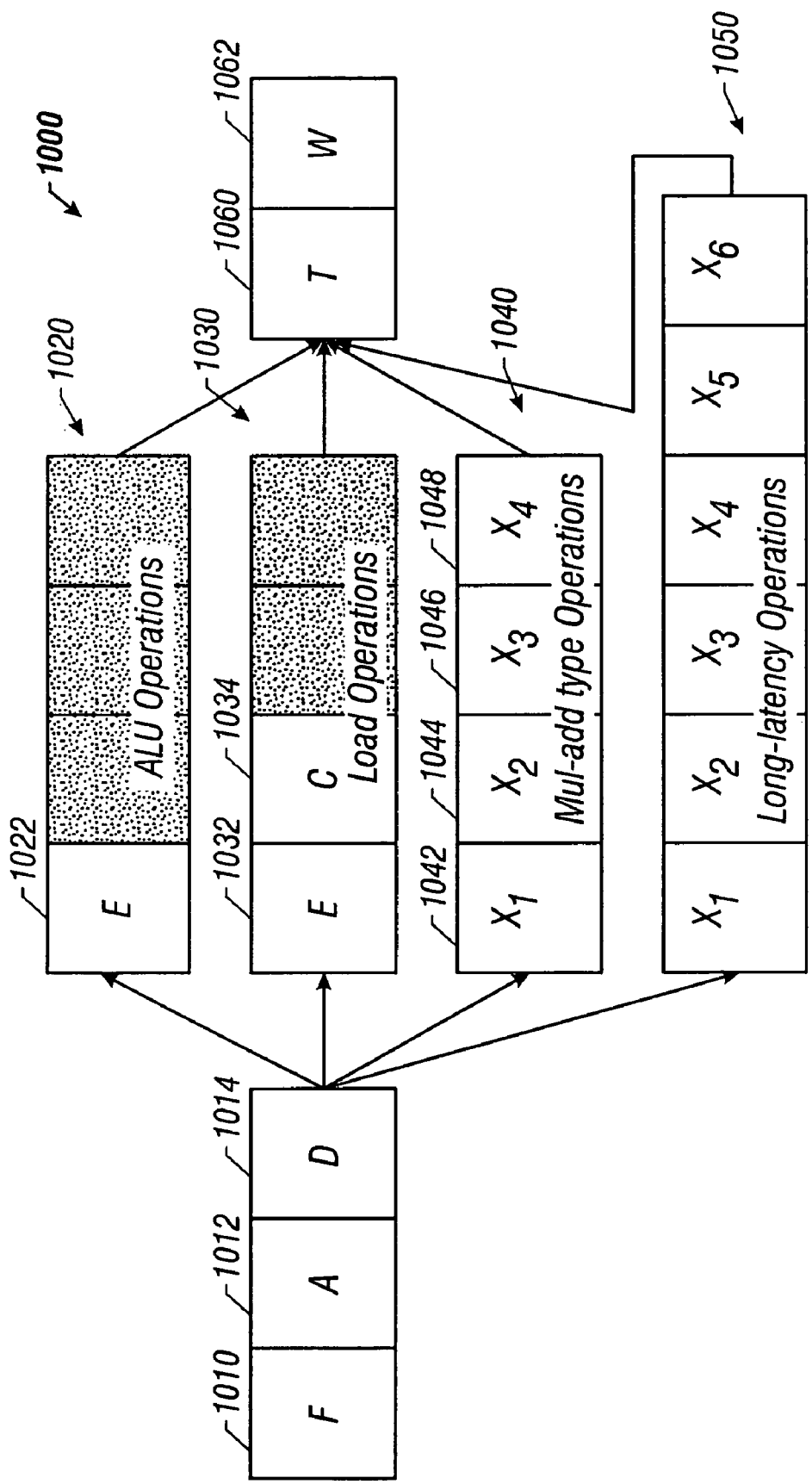
FIG. 10 is a schematic timing diagram that illustrates timing of the processor pipeline.

Referring to FIG. 10, a simplified schematic timing diagram illustrates timing of the processor pipeline 1000. The pipeline 1000 includes nine stages including three initiating stages, a plurality of execution phases, and two terminating stages. The three initiating stages are optimized to include only those operations necessary for decoding instructions so that jump and call instructions, which are pervasive in the Java™ language, execute quickly. Optimization of the initiating stages advantageously facilitates branch prediction since branches, jumps, and calls execute quickly and do not introduce many bubbles.

The first of the initiating stages is a fetch stage 1010 during which the processor 100 fetches instructions from the 16Kbyte two-way set-associative instruction cache 210. The fetched instructions are aligned in the instruction aligner 212 and forwarded to the instruction buffer 214 in an align stage 1012, a second stage of the initiating stages. The aligning operation properly positions the instructions for storage in a particular segment of the four register file segments 310, 312, 314, and 316 and for execution in an associated functional unit of the three media functional units 220 and one general functional unit 222. In a third stage, a decoding stage 1014 of the initiating stages, the fetched and aligned VLIW instruction packet is decoded and the scoreboard (not shown) is read and updated in parallel. The four register file segments 310, 312, 314, and 316 each holds either floating-point data or integer data. The register files are read in the decoding (D) stage.

Following the decoding stage 1014, the execution stages are performed. The two terminating stages include a trap-handling stage 1060 and a write-back stage 1062 during which result data is written-back to the split register file 216.

Instructions are specified in instruction words that include one gfu instruction and zero to three mfu instructions. A gfu instruction begins with a two-bit header field that is a count of the number of mfu instructions that follow in the instruction word. All instructions in an instruction word are issued in the same cycle.

Less than the maximum of three mfu instructions are included in an instruction word if useful operations are not needed at a particular time. However, if a mfu position is vacant, the vacancy must occur in latter mfu positions (mfu3 and/or mfu2) rather than an earlier position (mfu1).

Latency is propagated from the general functional unit 222 to the media functional units 220 in the order gfu, mfu1, mfu2, and mfu3. An assembler determines the beginning of an instruction word and the value of the two-bit instruction-count header from the presence of a gfu instruction and position of the next gfu instruction. The mfu instructions that follow form the remainder of the instruction word. More than three consecutive mfu instructions are reported as a fatal error since the assembler cannot create a well-formed instruction word without a gfu instruction.

Many mnemonics designate instructions that are implemented both as gfu and mfu operations and thus indicate a gfu instruction only when used at the beginning of an instruction word.

The general functional unit 222 and the media functional units 220 implement several instruction formats. A first instruction format is a 'CALL' instruction format which is shown, as follows:

| 2 | 4 | 26 |
|---|---|---|
| H | 0001 | immediate |

The 'CALL' is implemented only on the general functional unit 222. The H-bits designate the number of mfu instructions in the instruction word that begins with the CALL instruction. The target address in the immediate field includes a combination of an offset in the high-order 17 bits and an address in the low-order 9 bits. The low-order 9 bits are shifted left 5 bits to account for the 32-byte alignment requirement for a CALL target and designate the low-order 14 bits of the target address. The remaining 17 bits encode a two's-complement number that is added to the high-order 18 bits of the program counter of the CALL instruction to attain the high-order 18 bits of the target address.

A second format is a Common Format and has a form, as follows:

| 2 | 3 | 6 | 7 | 7 | 7 |
|---|---|---|---|---|---|
| H | fmt | opcode | rd | rs1 | rs2 or imm |

Both the general functional unit 222 and the media functional units 220 implement the Common Format. For gfu instruction usage, the H-field is the count of mfu instructions that follow in the instruction word. For mfu instruction usage, the H-field is set to either 00 or 11. The fmt field is useful to subdivide the opcode space but essentially operates as an extension of the opcode. Instructions that use what would otherwise be the second source register field as an immediate flag such a usage by setting the low-order of fmt-field (bit-27 of the instruction), thereby designating an i-bit.

A third format is a Conditional Branch Format and has the form, as follows:

| 2 | 7 | 2 | 7 | 14 |
|---|---|---|---|---|
| H | 00000XX | P | rd | immediate |

Only the general functional unit 222 implements conditional branch instructions so that the H-bit always designates the number of mfu instructions in the instruction word that begins with the conditional branch. The P-field encodes the prediction specifiers (i) statically predicted taken (pt) and (2) staticly predicted not taken (pn). Specifying neither pt nor pn implies selection of a hardware prediction, if prediction is implemented. Prediction coding includes coding of branch on condition, branch on condition statically predicted taken, and branch on condition statically predicted not taken. The low-order 12 bits of the immediate field designate the low-order 12 bits of the branch target word address. The upper-order two bits of the immediate field express the difference between the remaining high-order bits of the branch address, BA, and the target address, TA.

A fourth format is a Sethi, Setlo, and Addlo Format and has the form, as follows:

| 2 | 7 | 2 | 7 | 14 |
|---|---|---|---|---|
| H | 01110XX | i2 | rd | immediate |

The Sethi, Setlo, and Addlo instructions are implemented on the general functional unit 222 and the media functional units 220. For the general functional unit 222 position of an instruction word, the H-field designates the number of mfu instructions in the instruction word. In a media functional unit 220 position, the H-filed is set to zero. A two-bit i2 field and a 14-bit immediate field are concatenated into a single 16-bit value.

A fifth format is a media functional unit 220 (mfu) Three-Source Register format and has a form, as follows:

| 2 | 3 | 6 | 7 | 7 | 7 |
|---|---|---|---|---|---|
| H | op | rd | rs3 | rs1 | rs2 |

Only the media functional units 220 implement the mfu three-source register format. The H-field is non-zero. If the H-field is equal to 11, then the op-field is set to 10.

Several instructions may implement implicitly-derived register specifiers in various embodiments of the processor 100.

A bit extract (bitext) instruction is a pixel instruction that implements implicitly-derived register specifiers in some processor embodiments. The bitext instruction extracts bits from even-aligned pairs of registers r[rs1] and r[rs1+1]. The extracted field is described by a 6-bit length in bits 21 . . . 16 of register r[rs2], and a 5-bit skip count in bits 4 . . . 0 of register r[rs2]. The skip count is applied at the high-order end of register r[rs1]. A length longer than 32-bits is clipped to the limit of 32 bits. The field extracted by the bitext instruction is right-justified in the destination register r[rd] without sign-extension. The assembler reports a fatal error if the first source register is not even. The assembler syntax is:

bitext rs1,rs2,rd where the source register r[rs1+1] is implicitly derived. The bitext instruction is an mfu operation that uses the common instruction format.

A call instruction is a control flow instruction that uses implicitly-derived register specifiers in some processor embodiments. The general functional unit 222 alone implements the call instruction which uses the call instruction format. Call causes a control transfer to an address specified by a label operand, using a syntax, as follows:

call label.

Encoding of the call target in the instruction is described with the call instruction format. Whether a call target outside a code module is reachable in the encoding is generally unknowable until the caller and callee modules are linked. The address of the instruction word following the instruction word begun with the call instruction is held in register r2, an implicit operand of the call instruction. Thus, the assembler uses the alias lp (link pointer) for register r2.

A dadd instruction is a floating point instruction that may use an implicitly-derived register specifier in some embodiments of the processor 100. The dadd instruction is an mfu operation that is formatted in the common instruction format. The dadd instruction computes the addition of registers r[rs1] and r[rs2] where the values of the source operands are IEEE double-precision floating point numbers. The result is delivered in destination register r[rd]. All the operands are evenly-aligned register pairs that implicitly derive registers r[rs1+1] and r[rs2+1] from the explicitly-specified registers r[rs1] and r[rs2], respectively, and implicitly derive destination register r[rd+1] from the explicitly-specified register r[rd]. Explicitly-specified registers that are not even-aligned provoke a fatal assembly error. The dadd instruction mnemonic may be qualified by a rounding mode specification. The assembler syntax is, as follows:

dadd rs1,rs2,rd.

Instructions dcmpeq, dcmple, and dcmplt are floating point instructions that be implemented to use implicitly-derived register specifiers. Instructions dcmpeq, dcmple, and dcmplt are mfu operations that are formatted in the common instruction format. The dcmpeq, dcmple, and dcmplt are floating point instructions that compare the double-precision floating point operands in even-aligned source registers r[rs1] and r[rs2] and transfer the result of the comparison into a destination register r[rd]. The result is the value one if the comparison is true and zero if it is not. The dcmpeq, dcmple, and dcmplt operations are NaN-aware. The source operands are evenly-aligned register pairs that implicitly derive registers r[rs1+1] and r[rs2+1] from the explicitly-specified registers r[rs1] and r[rs2], respectively. If either source register is not even, the assembler reports a fatal error. Instruction dcmpeq checks for equality. Instruction dcmple tests whether the first source operand in less than or equal to the second. Instruction dcmplt tests whether the first source operand is less than the second. The assembler syntax is:

dcmpeq rs1, rs2, rd, dcmple rs1, rs2, rd, and dcmplt rs1, rs2, rd.

A dmul instruction is a floating point instruction that may be implemented to use an implicitly-derived register specifier in some processor embodiments. The dmul instruction a multiplication, r[rs1]*r[rs2], in which the values of the source operands are IEEE double-precision floating point numbers. The result is delivered in register r[rd]. All the operands are evenly-aligned register pairs that implicitly derive registers r[rs1+1] and r[rs2+1] from the explicitly-specified registers r[rs1] and r[rs2], respectively, and implicitly derive destination register r[rd+1] from the explicitly-specified register r[rd]. All suitable operands are even-aligned register pairs, a condition enforced by the assembler which otherwise provokes a fatal assembly error. The instruction mnemonic may be qualified by a rounding mode specification. The assembler syntax of the dmul instruction is, as follows:

dmul rs1,rs2,rd, where dmul is an mfu operation that uses the common instruction format.

A dsub instruction is a floating point instruction that computes a subtraction, r[rs1]−r[rs2], and delivers a result in register r[rd]. Some processor embodiments implement the dsub instruction to use implicitly derived register specifiers. Values of the source and destination operands are IEEE double-precision floating point numbers. Suitable operands are even-aligned register pairs including explicitly-specified registers r[rs1], r[rs2], and r[rd] and implicitly-derived register specifiers r[rs1+1], r[rs2+1], and r[rd+1], respectively. Even alignment is a condition enforced by the assembler which otherwise provokes a fatal assembly error. The assembler syntax is:

dsub rs1,rs2,rd, where dsub is an mfu operation that uses the common instruction format.

A dtof instruction is a floating point instruction that converts the IEEE double-precision number in the even-aligned register pair r[rs1] to an IEEE single-precision floating point number in the register r[rd]. Some processor embodiments implement the dtof instruction to use implicitly derived register specifiers. A suitable source operand is an even-aligned register pair including the explicitly-specified register r[rs1] and implicitly-derived register specifiers r[rs1+1], otherwise the assembler reports a fatal error. The dtof instruction mnemonic may be qualified by a rounding mode specification. The assembler syntax of dtof is:

dtof rs1, rd, where dtof is an mfu instruction that uses the common instruction format, but does not use a second source operand.

A dtoi instruction is a floating point instruction that converts the IEEE double-precision number in the even-aligned register pair r[rs1] to an integer in a destination register r[rd]. A suitable source operand is an even-aligned register pair including the explicitly-specified register r[rs1] and, in processor embodiments that implement implicitly derived register specifiers, implicitly-derived register specifiers r[rs1+1], otherwise the assembler reports a fatal error. The assembler syntax is:

dtoi rs1,rd where dtoi is an mfu instruction that uses the common instruction format, but does not use a second source operand.

A dtol instruction is a floating point instruction that converts an IEEE double-precision number in an even-aligned register pair r[rs1] to a long integer in the even-aligned register pair r[rd]. In processors using implicitly derived register specifiers, suitable operands are even-aligned register pairs including explicitly-specified registers r[rs1] and r[rd] and implicitly-derived register specifiers r[rs1+1] and r[rd+1], respectively. Even alignment is a condition enforced by the assembler which otherwise provokes a fatal assembly error. The assembler syntax is:

dtol rs1,rd, where dtol is an mfu instruction that uses the common instruction format, but does not use a second source operand.

A dabs instruction is a double precision floating point instructions that compute absolute value using implicitly-derived register specifiers in processor embodiments that support implicitly-defined register specifiers in the dabs instruction. The result of the dabs instruction is equal to the value of the source operand with the sign-bit cleared. The dabs instruction has a source in the even-aligned pair of registers specified by r[rs1] and implicitly defined as register r[rs1+1] and places a result in the even-aligned pair of registers specified by r[rd] and implicitly r[rd+1]. If either explicitly-specified operand of dabs is not even-aligned, the instruction produces an illegal_inst general exception. The assembler syntax is:

dabs rs1,rd, where fabs is implemented on all units. The dabs instruction is implemented only on media functional units 220 and uses the common instruction format with no second source operand.

A dmax instruction and a dmin instruction are double precision floating point instructions that compute the maximum and the minimum of a source operand, respectively. The dmax and dmin instructions may use implicitly-derived register specifiers and receive two double precision source operands in the even-aligned register pairs explicitly specified by r[rs1] and r[rs2] to produce a copy of the greater value (dmax) or the smaller value (dmin) in the even-aligned register pair specified by r[rd]. If any operand of dmax or dmin is not even-aligned, the instruction produces an illegal_inst General Exception. If a source operand is not a number (NaN), then the result is the NaN. If both source operands are NaNs, the result is the second NaN. The assembler syntax is:

dmax rs1,rs2,rd, dmin rs1,rs2,rd, where dmax and dmin are mfu instructions in the common instruction format.

A dneg instruction is a double precision instruction that negates the source operand so that the result of the instruction is equal to the source operand with the sign-bit complemented. The dneg instruction has a source in the even-aligned pair of registers explicitly specified by r[rs1] and implicitly defined as r[rs1+1], in processors that support dneg with implicitly-derived specifiers, and a result in the even-aligned pair of registers explicitly specified by r[rd] and implicitly defined by r[rd+1]. If either operand of dneg is not even-aligned, the instruction produces an illegal$_{13}$inst General Exception. The assembler syntax is:

dneg rs1,rd, where dneg is implemented only on media functional units 220 and uses the common instruction format with no second source operand.

A ftod instruction and a ftol instruction are floating point instructions that converts an IEEE single-precision number in the register r[rs1] to, respectively, an IEEE double-precision number in the even-aligned register pair r[rd] and a long integer in the even-aligned register pair r[rd]. In some processor embodiments, the ftod and ftol instructions use implicitly-derived register specifiers for the destination register r[rd], implicitly defining the register r[rd+1]. If the destination register r[rd] is not even, the assembler reports a fatal error. The assembler syntax is:

ftod rs1,rd, ftol rs1,rd, where ftod and ftol are mfu instructions that use the common instruction format with no second source operand.

An itod instruction is a floating point instruction that converts an integer in the register r[rs1] to an IEEE double-precision floating point number in the even-aligned register pair r[rd]. In some processor embodiments, the itod instruction uses implicitly-derived register specifiers for the destination register r[rd], implicitly defining the register r[rd+1]. If the destination register r[rd] is not even, the assembler reports a fatal error. The assembler syntax is:

itod rs1,rd, where itod is an mfu instruction that uses the common instruction format, with no second source operand.

In some processors instructions lcmpeq, lcmple, lcmplt, and lcmpult compare a long integer value in the even-aligned register pair explicitly specified by r[rs1] and implicitly specified by r[rs1+1] with either a long integer value in the even-aligned register pair explicitly specified by r[rs2] and implicitly defined by r[rs2+1] or a sign-extended 7-bit immediate value. If the comparison is true, the result register r[rd] is set to the integer value 1; otherwise, the result register r[rd] is set to value 0. Instruction lcmpeq tests for equality. Instruction lcmple determines whether the first operand (r[rs1], r[rs1+1]) is less than or equal to the second operand (r[rs2], r[rs2+1]) or immediate). Instruction lcmplt determines whether the first operand (r[rs1], r[rs1+1]) is less than the second operand (r[rs2], r[rs2+1]) or immediate). Instruction lcmpult determines whether the first operand (r[rs1], r[rs1+1]) is less than the second operand (r[rs2], r[rs2+1]) or immediate) buts operates upon the operands as unsigned integers. The assembler syntax is:

lcmpeq rs1,reg_or_imm7,rd, lcmple rs1,reg_or_imm7,rd, lcmplt rs1,reg_or_imm7,rd, lcmpult rs1,reg_or_imm7,rd, where the lcmpeq, lcmple, lcmplt, and lcmpult instructions are implemented on the media functional units 220 using the common instruction format.

Instructions Itod and Itof are floating point instructions that convert a long integer in the even-aligned register pair r[rs1] to, respectively, an IEEE double-precision floating point number in the even-aligned register pair r[rd] and to an IEEE single-precision floating point number in the register r[rd]. In some processor embodiments, the Itod instruction uses implicitly-derived register specifiers for the source register r[rs1], implicitly defining the register r[rs1+1] and for the destination register r[rd], implicitly defining the register r[rd+1]. The Itof instruction uses implicitly-derived register specifiers for the destination register r[rd], implicitly defining the register r[rd+1]. If the destination register r[rd] is not even for either the ltod and ltof instruction or the source register r[rs1] is not even for the Itod instruction, the assembler reports a fatal error. The Itod and Itof instruction mnemonics may be qualified by a rounding mode specification as shown in the opcode table. The assembler syntax is:

ltod rs1,rd, ltof rs1,rd, where ltod and ltof are mfu instructions that use the common instruction format with no second source operand.

Some processors support a pack instruction which implements implicitly derived register specifiers, Pack is a pixel instruction that operates upon a first source operand, the even-aligned registers pair r[rs1] and implicitly-defined register r[rs1+1], as four signed 16-bit operands. Each 16-bit operand is shifted right by the value of the low-order four bits of a second source operand r[rs2]. The shifted, signed short values of registers r[rs1] and r[rs1+1] are clipped to values between 0 and 255 and placed in the destination register r[rd] so that, if the resulting short is negative, zero is the clipped value. If the result is greater than 255, then 255 is the clipped value. Values between 0 and 255 are unchanged. The pack result values are packed into the result register r[rd] with the value derived from bits 31:16 of register r[rs1] set in bits 31:24, the value derived from bits 15:0 of register r[rs1] in bits 23:16, the value derived from bits 31:16 of register r[rs1+1] in bits 15:8, and the value derived from bits 15:0 of register r[rs1+1] in bits 7:0. The assembler reports a fatal error if the first source operand is not an even-aligned register. The assembler syntax is:

pack rs1,rs2,rd, where pack is an mfu operation that uses the common instruction format.

Instruction pcst is a hybrid operation that may support implicitly-derived register specifiers. Pcst combines the behavior of conditional stores with parallel operations. The assembler syntax is:

pcst rd, [rs1],rs2, where the second source operand r[rs2] defines is a pair of 16-bit conditions that control whether a corresponding half of destination register r[rd] is stored at the address defined by the first source register r[rs1]. The first source register is explicitly defined as r[rs1] and includes an implicitly-derived register specifier r[rs1+1]. The address must be word-aligned. The pcst instruction is a word-store operation in which one, the other, both, or neither halves of a word might change, depending on whether the halves of the control register, r[rs2]. Non-zero control register-half stores; zero control register-half does not. The pcst instruction is a general functional unit 222 operation that uses the common instruction format.

An instruction lshll may support implicitly derived register specifiers. Lshll is a logical instruction that computes a shift value:

r[rs1]>>r[rs2], or r[rs1]>>imm.

Use of an immediate for the second source operand sets the i-bit of the opcode. The result is left in register r[rd]. Instruction lshll shifts a 64-bit datum to produce a 64-bit result. Only the low-order 6 bits of the second source operand are used for execution of lshll. The first register operand r[rs1] includes an implicitly-derived register specifier r[rs2]. Similarly the result register r[rd] includes an implicitly-derived register specifiers r[rd+1]. The source and destination registers are thus even-aligned register pairs. Otherwise, the assembler produces a fatal error. Other register operands include any visible general purpose register. The lshll instruction uses the common instruction format and is implemented only on the media functional units 220.

Instructions lshra and lshrl are possibly implemented as implicitly-derived register specifiers. Lshra and lshrl are logical instruction that compute:

r[rs1]>>r[rs2], and r[rs1]>>imm.

Usage of an immediate for the second source operand sets the i-bit of the opcode. The result is held in destination register r[rd]. Instruction lshra is an arithmetic shift so that a set sign bit is propagated to the right. Instruction lshrl is a logical shift so that bits are cleared on the left. Instructions lshra and lshrl shift a 64-bit datum producing a 64-bit result. Only the low-order 6 bits of the second source operand are used for the lshra and lshrl instructions. The first register operand r[rs1] and the result register r[rd] of lshra and lshrl are explicitly-specified and are respectively associated with implicitly-derived register specifiers r[rs1+1] and r[rd+1]. The specified registers r[rs1] and r[rd] and are to be even-aligned register pairs. Otherwise, the assembler produces a fatal error. Other register operands may be any visible general purpose register. The assembler syntax is:

lshra rs1,reg_or_imm7, rd, and lshrl rs1, reg_or_imm7, rd, where the lshra and lshrl instructions use the common instruction format and are implemented only on media functional units 220.

Instructions stl and stla are memory access instructions that may employ implicitly-derived register specifiers. The stl and stla instructions store a 64-bit long from an even-aligned pair of registers specified explicitly by a register r[rd] and implicitly-derived register r{rd+1] to a specified address. The assembler syntax is:

stl rd, [address], and stla rd, [address], [asi].

The stl and stla instructions are general functional unit 222 operations that uses the common instruction format. The stla[12] instruction is an "alternate space" store operation that operates as an ordinary store except that the effective addresses are qualified by two alternate space identifiers (ASIs 1 and 2). Which ASI is used is denoted by the last character of the mnemonic. The assembly syntax is identical to ordinary stores but is also appended with "a1" or "a2".

An lsub instruction is an integer instruction that computes the difference of two register operands r[rs1]−r[rs2] or one register operand and a sign-extended 7-bit immediate r[rs1]−sign_ext(imm7) and places the result in r[rd]. The use of an immediate for the second source operand sets the i-bit of the opcode. Some processor embodiments by support implicitly-derived register specifiers for the lsub instruction. The register operands of lsub are even-aligned register pairs with the first register of the pair explicitly-specified in the instruction and the second instruction of the pair being an implicitly-derived register specifier. The assembler produces a fatal error for an odd-numbered register operand for lsub. The assembler syntax is:

lsub rs1, reg_or_imm7, rd, where the lsub instruction uses the common format and is implemented only on media functional units 220.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

CROSS-REFERENCE

The present invention is related to subject matter disclosed in the following co-pending patent applications:

1. United States patent application entitled, "A Multiple-Thread Processor for Threaded Software Applications", Ser. No. 09/204,480 naming Marc Tremblay and William Joy as inventors and filed on even date herewith;
2. United States patent application entitled, "Clustered Architecture in a VLIW Processor", Ser. No. 09/204, 584 naming Marc Tremblay and William Joy as inventors and filed on even date herewith;
3. United States patent application entitled, "Apparatus and Method for Optimizing Die Utilization and Speed Performance by Register File Splitting", Ser. No. 09/204,481 naming Marc Tremblay and William Joy as inventors and filed on even date herewith;
4. United States patent application entitled, "Variable Issue Width VLIW Processor", Ser. No. 09/204,536 naming Marc Tremblay as inventors and filed on even date herewith;
5. United States patent application entitled, "Efficient Handling of a Large Register File for Context Switching", Ser. No. 09/204,586 naming Marc Tremblay and William Joy as inventors and filed on even date herewith;
6. United States patent application entitled, "Dual In-line Buffers for an Instruction Fetch Unit", Ser. No. 09/205, 121 naming Marc Tremblay and Graham Murphy as inventors and filed on even date herewith;
7. United States patent application entitled, "An Instruction Fetch Unit Aligner", Ser. No. 09/204,781 naming Marc Tremblay and Graham Murphy as inventors and filed on even date herewith;
8. United States patent application entitled, "Local Stall Control Method and Structure in a Microprocessor", Ser. No. 09/204,535 naming Marc Tremblay and Sharada Yeluri as inventors and filed on even data herewith; and
9. United States patent application entitled, "Local and Global Register Partitioning in a VLIW Processor", Ser. No. 09/204,585 naming Marc Tremblay and William Joy as inventors and filed on even data herewith.

What is claimed is:

1. A processor comprising:
   a register file; and
   a functional unit, coupled to the register file, that executes an instruction that operates upon plural registers of said register file, including at least one register explicitly identified by an explicitly defined register specifier and at least one other register implicitly identified by the explicitly-defined register specifier.

2. A processor according to claim 1 wherein:
   a register specifier for the other register is implicitly derived by adding one to the explicitly-defined register specifier.

3. A processor according to claim 1 wherein the processor is a Very Long Instruction Word (VLIW) processor and wherein
   said register file further including a plurality of register file segments wherein the plurality of registers are divided among said plurality of register file segments; and
   wherein said VLIW processor further comprises a plurality of functional units, ones of the plurality of functional units being coupled to and associated with respective ones of the register file segments.

4. A processor according to claim 1 wherein:
   the instruction is a multiply-add instruction that uses an implicitly-derived register specifier and has a form of:

muladd rs1, rs2, rd, and performs an operation specified by the equation:

$rd=(rs1*[rs1+1])+rs2$, where the term [rs1+1] designates data contained within the register following the explicitly-defined register rs1.

5. A processor according to claim 1 wherein:
   the instruction is a bit extract instruction that uses an implicitly-derived register specifiers and has a form of:

bitext rs1, rs2, rd, and per.forms an operation of extracting bits from even-aligned pairs of registers r[rs1] and [rs1+1] where the term [rs1+1] designates data contained within the other register following the explicitly-defined register rs1, wherein data in register r[rs2] describes the extracted field of registers r[rs1] and r[rs1+1] and register r[rd] is a destination register.

6. A processor according to claim 1 wherein:
the instruction is a call instruction that uses an implicitly-derived register specifiers and has a form of:

call label, causing a control transfer to an address specified by a label operand, the address of the instruction word following the instruction word begun with the call instruction is held in an alias register, an implicit operand of the call instruction, with an assembler using an alias link pointer lp for pointing to the alias register.

7. A processor according to claim 1 wherein:
the instruction is a double-precision floating point add instruction that uses an implicitly-derived register specifiers and has a form of:

dadd rs1, rs2, rd, and performs an operation specified by the equation:

(rd, [rd+1]=(rs1, [rs1+1])+(rs2, [rs2+1]), where the terms (rs1, [rs1+1]), (rs2, [rs2+1]), and (rd, [rd+4]) designate double-precision words.

8. A processor according to claim 1 wherein:
the instruction is a double-precision floating point compare instruction that uses an implicitly-derived register specifiers and has a form of:

dcmpee rs1, rs2, rd, and performs an operation of comparing data in registers (rs1, [rs1+1]) with data in registers (rs2, [rs2+1]) and storing a result in registers (rd,[rd+1]) where the terms (rs1, [rs1+1]), (rs2, [rs2+1]), and (rd, [rd+1]) designate double-precision words, and cc designates a condition code including equal, less than, and less than or equal to conditions.

9. A processor according to claim 1 wherein:
the instruction is a double-precision floating point multiply instruction that uses an implicitly-derived register specifiers and has a form of:

dmul rs1, rs2, rd, and performs an operation specified by the equation:

(rd, [rd+1]=(rs1, [rs1+1])*(rs2, [rs2+1]), where the terms (rs1, [rs1+1]), (rs2, [rs2+1]), and (rd, [rd+1]) designate double-precision words.

10. A processor according to claim 1 wherein:
the instruction is a double-precision floating point subtraction instruction that uses an implicitly-derived register specifiers and has a form of:

dsub rs1, rs2, rd, and performs an operation specified by the equation:

(rd, [rd+1])=(rs1, [rs1+1])−(rs2, [rs2+1]), where the terms (rs1, [rs1+1]), (rs2, [rs2+1]), and (rd, [rd+1]) designate double-precision words.

11. A processor according to claim 1 wherein:
the instruction is a pack instruction that uses an implicitly-derived register specifiers and has a form of:

pack rs1, rs2, rd, and operates upon a register pair (rs1, [rs1+1]) as four signed 16-bit operands, and shifts the four operands right by a value designated by the register specified by rs2, clips the shifted 16-bit operands within defined limits and stores the clipped 16-bit operands in a register pair (rd, [rd+1]).

12. A processor according to claim 1 wherein:
the instruction is a double-precision floating point conversion instruction that uses an implicitly-derived register specifiers and has a form of:

dtox rs1, rd, and performs an operation of converting a double-precision floating point value to a specified format x, the format x including a single-precision floating point format (dtof), an integer format (dtoi), and a long integer format (dtol).

13. A processor according to claim 1 wherein:
the instruction is a double-precision floating point absolute value instruction that uses an implicitly-derived register specifiers and has a form of:

dabs rs1, rd, and performs an operation of converting a double-precision floating point value in a register pair (rs1, [rs1+1]) to an absolute magnitude in a register pair (rd, [rd+1]).

14. A processor according to claim 1 wherein:
the instruction is a double-precision floating point negative value instruction that uses an implicitly-derived register specifiers and has a form of:

dneg rs1, rd, and performs an operation of converting a double-precision floating point value in a register pair (rs1, [rs1+1]) to a negative magnitude in a register pair (rd, [rd+1]).

15. A processor according to claim 1 wherein:
the instruction is a double-precision floating point set limit instruction that uses an implicitly-derived register specifiers and has a form of:

dlim rs1, rs2, rd, and performs an operation of setting a double-precision destination register (rd, [rd+1]) to the maximum of a double-precision first source register (rs1, [rs1+1]) and a double-precision second source register (rs2, [rs2+1]), or setting the double-precision destination register (rd, [rd+1]) to the minimum of a double precision first source register (rs1, [rs1+1]) and a double precision second source register (rs2, [rs2+1]), where the terms (rs1, [rs1+1]), (rs2, [rs2+1]), and (rd, [rd+1]) designate double-precision words.

16. A processor according to claim 1 further comprising:
a decoder coupled to the functional unit and configured to generate a first pointer pointing to the explicitly-specified register and a second pointer pointing to the other register.

17. A processor according to claim 1 further comprising:
a pointer coupled to the register file and designating a register in the register file, the pointer including a signal indicative of selection of a the other register, wherein a register read of the explicitly-specified register is accompanied by a register read of the other register when implicit derivation of the explicitly-defined register specifier is selected.

18. The processor of claim 1, wherein the register specifier is encoded as an indirect specifier.

19. A method of operating a processor comprising:
storing information in a register file including a plurality of registers;
executing instructions in a functional unit coupled to the register file and operating upon a plurality of registers in the register file;
explicitly defining a register specifier of a register operated upon during executing of the instruction; and
implicitly deriving a register specifier of at least one other register operated upon during executing of the instruction based on the explicitly defined register specifier.

20. A method according to claim 19 further comprising:
decoding an instruction; and
deriving, during decoding of the instruction, a register specifier based on the explicitly-specified register specifier of the instruction.

21. A method according to claim 19 further comprising:
implicitly deriving the register specifier for the other register by adding one to the explicitly-defined register specifier.

* * * * *

UNITED STATES PATENT AND TRADEMARK OFFICE
CERTIFICATE OF CORRECTION

| | | |
|---|---|---|
| PATENT NO. | : 7,117,342 B2 | |
| APPLICATION NO. | : 09/204479 | |
| DATED | : October 3, 2006 | |
| INVENTOR(S) | : Marc Tremblay and William Joy | |

It is certified that error appears in the above-identified patent and that said Letters Patent is hereby corrected as shown below:

In Claim 4, Column 22, Line 53, between "the" and "register following" insert --other--.
In Claim 5, Column 22, Line 56, before "implicitly-derived register specifiers" delete "an".
In Claim 5, Column 22, Line 61, change "per.forms" to --performs--.
In Claim 6, Column 23, Line 2, before "implicitly-derived register specifiers" delete "an".
In Claim 7, Column 23, Line 14, before "implicitly-derived register specifiers" delete "an".
In Claim 7, Column 23, Line 21, change "[rd+4]" to --[rd+1]--.
In Claim 8, Column 23, Line 24, before "implicitly-derived register specifiers" delete "an".
In Claim 8, Column 23, Line 26, change "dcmpee" to --dcmpcc--.
In Claim 9, Column 23, Line 37, before "implicitly-derived register specifiers" delete "an".
In Claim 10, Column 23, Line 48, before "implicitly-derived register specifiers" delete "an".
In Claim 11, Column 23, Line 58, before "implicitly-derived register specifiers" delete "an".
In Claim 12, Column 24, Line 3, before "implicitly-derived register specifiers" delete "an".
In Claim 13, Column 24, Line 16, before "implicitly-derived register specifiers" delete "an".
In Claim 14, Column 24, Line 26, before "implicitly-derived register specifiers" delete "an".
In Claim 15, Column 24, Line 36, before "implicitly-derived register specifiers" delete "an".

UNITED STATES PATENT AND TRADEMARK OFFICE
CERTIFICATE OF CORRECTION

PATENT NO. : 7,117,342 B2
APPLICATION NO. : 09/204479
DATED : October 3, 2006
INVENTOR(S) : Marc Tremblay and William Joy It is certified that error appears in the above-identified patent and that said Letters Patent is hereby corrected as shown below:

In Claim 17, Column 24, Line 60, before "the other register" delete "a".

Signed and Sealed this

Sixth Day of February, 2007

JON W. DUDAS
*Director of the United States Patent and Trademark Office*